United States Patent [19]
Agrawal et al.

[11] Patent Number: 5,707,473
[45] Date of Patent: Jan. 13, 1998

[54] METHOD FOR MAKING A PANEL ASSEMBLY

[75] Inventors: Raj Kumar Agrawal; Niall R. Lynam, both of Holland, Mich.

[73] Assignee: Donnelly Corporation, Holland, Mich.

[21] Appl. No.: 526,949

[22] Filed: Sep. 12, 1995

Related U.S. Application Data

[62] Division of Ser. No. 951,733, Sep. 25, 1992, Pat. No. 5,475,956.

[51] Int. Cl.$^6$ ............ B29C 35/02; B29C 45/14; B29C 65/02; C09J 5/06
[52] U.S. Cl. ............ 156/245; 156/307.7; 156/321; 156/322; 264/259; 264/263; 264/271.1; 264/275; 264/279; 264/328.1; 264/328.2
[58] Field of Search ............ 156/91, 108, 242, 156/245, 307.7, 307.1, 321, 322; 264/252, 271.1, 274, 275, 279, 328.2, 263, 259, 328.1; 52/309.2, 309.3, 393, 418, 511

[56] References Cited

U.S. PATENT DOCUMENTS

| | | |
|---|---|---|
| 226,770 | 4/1880 | Morse . |
| 2,388,786 | 11/1945 | Knight et al. . |
| 2,502,970 | 4/1950 | Manning . |
| 2,928,967 | 3/1960 | Pfaender . |
| 3,016,578 | 1/1962 | Rohe .................. 264/274 |
| 3,037,070 | 5/1962 | Sussman et al. .......... 264/279 |
| 3,378,972 | 4/1968 | Stanley ................ 52/309.2 |
| 3,434,903 | 3/1969 | Hann ................... 156/108 |
| 3,759,004 | 9/1973 | Kent . |
| 3,785,104 | 1/1974 | Dailen . |
| 3,827,184 | 8/1974 | Pennec et al. . |
| 3,837,984 | 9/1974 | Wagner et al. . |
| 3,885,072 | 5/1975 | Zibritosky . |
| 3,981,113 | 9/1976 | Griffin . |
| 4,093,304 | 6/1978 | Ziegler . |
| 4,139,234 | 2/1979 | Morgan . |
| 4,174,245 | 11/1979 | Martineau ............. 156/245 |
| 4,183,778 | 1/1980 | Mesnel ............... 156/245 |
| 4,249,517 | 2/1981 | Schroeder et al. . |
| 4,348,792 | 9/1982 | Zahid ................ 264/271.1 |

(List continued on next page.)

FOREIGN PATENT DOCUMENTS

| | | |
|---|---|---|
| 571327 | 2/1959 | Canada . |
| 0368728 | 2/1985 | European Pat. Off. . |
| 390151 | 10/1990 | European Pat. Off. . |
| 3140366 | 2/1985 | Germany . |
| 193320 | 4/1989 | Japan . |
| 2175419 | 7/1990 | Japan . |
| 2182423 | 7/1990 | Japan . |
| 3236922 | 10/1991 | Japan . |
| 167457 | 8/1922 | United Kingdom . |
| 451507 | 8/1936 | United Kingdom . |
| 1347255 | 2/1974 | United Kingdom . |

OTHER PUBLICATIONS

"Use of the Rim Process for Producing Modular Window Assemblies for the Ford Motor Company." Submitted to Ford Motor Company by Excel Industries, Inc., Corporate Engineering Department, Sep. 23, 1981.
'Bayflex Polyurethane Elastomer Mold Design Manual' (Mobay RIM Technology), Copyrighted 1977, (Rev. 1982).

*Primary Examiner*—Richard Crispino
*Attorney, Agent, or Firm*—Van Dyke, Gardner, Linn & Burkhart, LLP

[57] ABSTRACT

A method for bonding an attachment member to a substrate substantially simultaneously with the formation of a sealing member, and a panel assembly made according to the method. The method includes the steps of applying an adhesive to either the attachment member or the substrate, or both, and holding or otherwise retaining the attachment member against the substrate. A sealing member is deposited on the substrate and encapsulates at least a portion of the attachment member. Heat, generated by the polymeric material or added by an external source, causes the adhesive to cure, creating a strong secure bond between the attachment member and the substrate. The attachment member may then be used to mount the substrate to another surface and securely fixed thereto by an adhesive adapted to bond the surface and attachment member together.

31 Claims, 5 Drawing Sheets

U.S. PATENT DOCUMENTS

| | | |
|---|---|---|
| 4,363,191 | 12/1982 | Morgan . |
| 4,364,214 | 12/1982 | Morgan et al. . |
| 4,364,595 | 12/1982 | Morgan et al. . |
| 4,465,734 | 8/1984 | Laroche et al. ............................ 156/91 |
| 4,584,155 | 4/1986 | Zanella . |
| 4,700,525 | 10/1987 | Nieboer et al. . |
| 4,712,341 | 12/1987 | Harris, Jr. et al. ........................ 52/511 |
| 4,723,809 | 2/1988 | Kida et al. . |
| 4,777,699 | 10/1988 | Hill et al. . |
| 4,792,425 | 12/1988 | Weaver . |
| 4,822,656 | 4/1989 | Hutter, III . |
| 4,839,122 | 6/1989 | Weaver . |
| 4,841,698 | 6/1989 | Gold . |
| 4,854,599 | 8/1989 | Barteck . |
| 4,854,636 | 8/1989 | Greenhalgh et al. . |
| 4,861,540 | 8/1989 | Nieboer et al. . |
| 4,894,972 | 1/1990 | Endoh et al. . |
| 4,925,237 | 5/1990 | Bohn et al. . |
| 4,951,907 | 8/1990 | Gold . |
| 4,951,927 | 8/1990 | Johnston et al. ........................ 264/263 |
| 4,986,595 | 1/1991 | Gold . |
| 4,993,774 | 2/1991 | Greenhalgh et al. . |
| 5,050,928 | 9/1991 | Bohm et al. . |
| 5,062,248 | 11/1991 | Kunert . |
| 5,236,650 | 8/1993 | Choby et al. . |
| 5,243,785 | 9/1993 | Nieboer et al. . |

METHOD FOR MAKING A PANEL ASSEMBLY

CROSS-REFERENCE TO RELATED APPLICATION

This is a division under 37 C.F.R. § 1.160 of prior U.S. application Ser. No. 07/951,733 filed Sep. 25, 1992, entitled PANEL ASSEMBLY, now U.S. Pat. No. 5,475,956.

BACKGROUND OF THE INVENTION

This invention relates to panel assemblies, and particularly to panel assemblies especially adapted for use as a window in vehicles, buildings or other structures, as well as a method for making such panel assemblies.

Relatively recent in the history of panel assemblies, gaskets have been molded or extruded directly onto the panel. In molded window panels, a sheet of glass is closed within a molding tool and a polymeric material is then injected on at least one surface of the panel and preferably proximate the peripheral edge. It is not uncommon for the polymeric material to be molded on three surfaces of the panel, encapsulating the entire peripheral edge. After the gasket is cured, the mold is opened and the panel assembly is removed.

To retain the molded window panel assembly within the vehicle, a bead of adhesive is often applied to the glass and/or gasket to bond the glass panel directly to the opening. Application of the adhesive bead to the gasket is desired so that the width of the pinchweld flange can be reduced. However, when the adhesive bead is applied to the gasket, window retention with the vehicle opening depends upon the adhesion of the bead to the gasket and also the adhesion of the gasket to the window panel. Any failure of these bonds can cause detachment of the panel assembly from the vehicle.

Studs, clips or other structures are often used in association with the molded gasket for a variety of purposes including acting as an attachment mechanism to the window opening, a temporary attachment until sealant cures, and as a positioning device or locater in the window opening. Traditionally, studs or clips are suspension molded within the polymeric material during the encapsulation process and act as the primary attachment mechanism to the window opening. The studs or clips, suspended within the hardened gasket, rely on the adhesion of the gasket material to the panel and the retention of the inserts (studs, clips) in the gasket to retain the panel in the opening. Thus, the window panel is retained within the opening by the bond between the gasket and the glass panel.

In another technique, studs or clips are bonded in an additional step directly to the glass panel inboard or outboard of the hardened gasket. In a typical configuration, the studs or clips are bonded directly to the glass panel at spaced intervals around the periphery of the gasket. One problem associated with this technique is that the attachment surface must be wider in order to accommodate both the gasket and the stud or clip. In some instances, the width of the frit layer commonly associated with such panels must be increased to conceal the studs or clips. The increase in width of the frit layer may partially obscure the field of vision through the panel. Moreover, the width of the pinchweld flange must be increased, or the width of the gasket reduced, in order to seal with the vehicle pinchweld flange and close the opening. Failure of any one of the individual, unsupported studs or clips reduces the integrity of the panel seal in the opening.

New vehicle styling requirements are calling for flush mounted glass panels having an exposed edge. To satisfy this requirement, the gasket material is bonded to at least a portion of one surface proximate the peripheral edge of the panel. Retention of the glass panel within the vehicle opening depends solely on either the adhesion between the gasket material and the glass panel or the retention of the suspended stud or clip in the gasket. Failure of either one of these jeopardizes retention of the panel in the opening as the sealing integrity of flush mounted panel assemblies.

SUMMARY OF THE INVENTION

In the present invention, an insert, as for example to facilitate attachment of a panel assembly to a vehicle or other structure, is held in place against a substrate while polymeric material is molded at least partially over the insert and onto the substrate. A method for holding the insert in place against the substrate during the molding process is also disclosed.

The assembly offers several advantages over the prior art, including a more secure attachment of the panel assembly in the panel opening than gasket suspended studs or clips, and allows a narrower or thinner pinchweld flange and frit width than prior panels. A still further advantage includes strengthening of the gasket to adhesive bead bond by providing a mechanical anchoring and/or metallic bonding surface. The method offers advantages which include rapid production cycle time and less labor costs since the insert is automatically located, bonded and molded in a single step. These and other advantages and benefits will become readily apparent from a study of the following description taken in conjunction with the drawing figures appended hereto and described below.

DETAILED DESCRIPTION OF THE PREFERRED EMBODIMENTS

In one embodiment, the panel assembly includes a sheet-like panel having at least one surface. A gasket assembly is fixed to the panel surface retaining the panel assembly in a panel opening. The gasket assembly includes an attachment member or insert having a portion bonded directly to the panel using an adhesive. The attachment member is at least partially encapsulated by a molded thermoplastic or thermoset polymeric material which also becomes adhered to the panel surface. Another adhesive is then adapted to fix the panel assembly in the panel opening wherein the adhesive is bonded to the attachment member, or the panel, and/or the polymeric material. The attachment members include metal, ceramic, plastic or composite metal/plastic studs, clips, channels, strips and/or spacers.

One method for manufacturing the panel assembly includes the steps of bonding an attachment member or insert to a substrate during the step of molding a polymeric material about at least a portion of the attachment member on the substrate. In another embodiment, the attachment member or insert is retained or otherwise biased against the substrate during the molding process to prevent the polymeric material from invading between the attachment member and the substrate. The bond between the attachment member and substrate is achieved by an adhesive, set, cured or hardened by the addition of heat, prior to, during and/or after the molding process.

Figure 1:
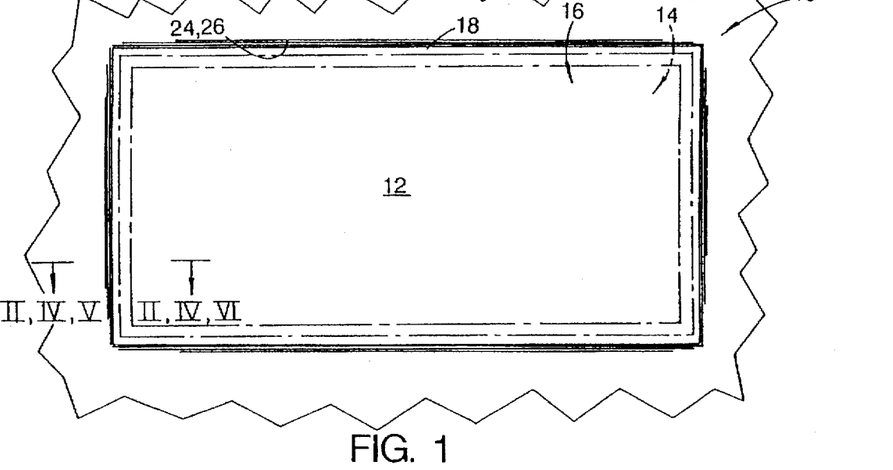
FIG. 1 is a generalized view of one embodiment of a panel assembly particularly adapted for use in vehicles.
Figure 2:
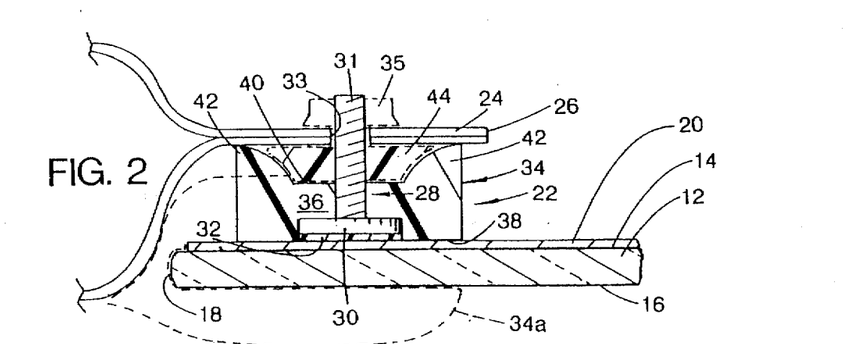
FIG. 2 is a fragmentary section view of one embodiment of the panel assembly taken along line II—II of FIG. 1.

In referring to the drawing figures, like reference numerals will be used to indicate like components. FIGS. 1 and 2 illustrate one embodiment of a panel assembly 10 used to exemplify the concept of bonding an attachment member or other insert to a substrate and at least partially surrounded by a polymeric material molded onto the substrate. Assembly 10 is especially suitable for windows in vehicles, buildings and other structures. Although of general application, the following description will be made with specific reference to vehicle panel assemblies.

In a preferred embodiment (FIGS. 1 and 2), panel assembly 10 includes a substrate such as sheet 12 having a gasket assembly 22 secured thereto. Gasket assembly 22 includes an insert member 28 at least partially embedded against substrate 12 by a polymeric sealing gasket 34, molded to sheet 12 near the periphery 18 thereof. To manufacture assembly 10, sheet 12 is placed in a mold, and insert 28 is biased or held firmly against sheet 12 while gasket 34 is molded over it. Preferably, insert 28 is firmly attached to sheet 12 by an adhesive layer 32, most preferably a heat activated adhesive, with the heat of molding contributing thermal energy to the activation of the adhesive.

Preferably, substrate 12 is a sheet of transparent glass which may be tempered, laminated or otherwise strengthened using well-known techniques. Sheet 12 has two substantially parallel sides or faces 14, 16 which terminate at the outer margin of sheet 12 in a peripheral edge 18. Although transparent glass is disclosed, other panel materials such as an opaque or coated glass, a transparent, opaque or coated plastic, or a multi-laminate composite such as transparent glass and plastic could be used. Traditionally, sheet 12 includes an opaque, and preferably black ceramic frit layer or coating 20 (FIG. 2) applied and adhered to surface 14 for concealing the manner in which panel 12 is fixed in an opening.

Fixed to ceramic frit layer 20 on face 14, proximate peripheral edge 18, is a gasket assembly 22 adapted to engage pinchweld flange 24 defining window opening 26. In one embodiment illustrated in FIG. 2, gasket assembly 22 includes an attachment member or insert 28, such as a stud, clip, strip or other fastener/spacer, securely fastened or adhered directly to frit layer 20 at intervals along surface 14. For example, attachment member 28, illustrated in FIG. 2, is a zinc phosphate-coated or dichromate-coated stud having a head 30 bonded to frit layer 20 by adhesive 32. Shaft 31 of stud 28 extends from head 30 and passes through a hole 33 formed in flange 24. A nut 35 may be threaded on shaft 31 on the opposite side of pinchweld flange 24. Attachment member 28 may be made from metal, plastic, or a metal/plastic composite of sufficient strength and/or hardness to perform the desired task and which is compatible with surrounding materials.

It should be recognized that the substrate may have a curved surface, particularly on vehicle panel applications. The insert or attachment member preferably conforms as close as possible to the curved substrate. In those instances where the difference between the insert and curved surface is small, the thickness of the adhesive should be sufficient to make up or fill the gap. Preferably, the adhesive has a thickness in the range of 0.005 inch to 0.05 inch and, most preferably, is about 0.005 inch to 0.025 inch. The ability of the insert or attachment member to conform to the substrate is significant, especially when the insert is a strip which extends around the peripheral edge of the panel, as will be described below.

Adhesive 32, used to bond attachment member 28 to panel 12, may be any of a number of "one package" thermoplastic or thermoset adhesives in a solid, liquid, gel, tape or film form with the resulting bond able to withstand tension loads on the order of at least 10 pounds per square inch (psi). Most preferably, adhesive 32 is a thermosetting structural adhesive such as a modified epoxy in film form. For ease in handling and application, it is preferred that the adhesive be "one package" requiring no premixing of ingredients immediately prior to the molding step. It is also preferred that the adhesive be thermally activated at temperatures below 400° F. for reasons which will become apparent below. A preferred tape adhesive is a one-package modified structural adhesive epoxy produced by 3M Company of Minneapolis, Minn. known as Scotchweld AF-163-2U, while a preferred liquid adhesive is Multi-Cure brand 625 methacrylic-based adhesive, produced by Dymax Engineering Adhesives of Torrington, Conn. If desired, adhesion promoters such as silane coupling agents and primers formulated thereof can be applied to, or otherwise contacted with, the panel surface, insert and/or adhesive by wiping, spraying, incorporation in the adhesive, or any other suitable application or variation thereof. For example, two suitable silane coupling agents are gamma-aminopropyltriethoxysilane, designated as A-1100 brand from Union Carbide, Danbury, Conn., and gamma-methacryloxypropyltrimethoxysilane available under the brand name A-174, also available from Union Carbide.

As mentioned above, it is preferred that adhesive 32 be heat activated and most preferably, one which achieves a substantial cure below about 400° F. and with a short cure time (less than five minutes preferably, and most preferably less than three minutes). In the preferred method described below, the heat of molding gasket 34 over insert 28 contributes heat to achieve a temperature range between 100° to 400° F. to activate and cure the adhesive. Most preferably, the heat of molding substantially activates the adhesive, but the use of secondary heat either before, during or after molding may be used to aid the curing process. Secondary heating may be produced both generally or in localized areas in the mold or by preheating the substrate before placing it in the mold. Post heating can be applied in a localized or general manner after forming of the polymeric gasket described below.

Other adhesives such as the Multi-Cure brand 625 adhesive may be set using techniques including the application of heat, exposure to ultraviolet (UV) light, or by an activator. An activator is a reaction initiator applied to one bonding surface while the adhesive is applied to the other bonding surface. One such activator for the Multi-Cure brand 625 adhesive is sold under the designation Multi-Cure 535 produced by Dymax Engineering Adhesives. The activator may be applied generally to any surface opposite that receiving the adhesive and coming into contact with each other. Table I provides a list of other suitable one-package adhesives, as well as a recommended temperature to cure the adhesive.

TABLE I

| Manufacturer | Trade Name | Curing Temperature |
| --- | --- | --- |
| Ciba Geigy | R 382-3 | 250° F. |
| Ciba Geigy | R 609 | 250° F. |
| 3M Corp. | Scotchweld AF-126-2 | 250° F. |
| 3M Corp. | Scotchweld AF-163-2U | 250° F. |
| Dexter Adhesives * | EA 9628 | 250° F. |
| B. F. Goodrich ** | PL-760 | 250° F. |
| B. F. Goodrich | PL-776 | 250° F. |
| Dexter Adhesives | EA 9657 | 350° F. |
| 3M Corp. | Scotchweld AF-42 | 350° F. |
| B. F. Goodrich | PL-770 | 350° F. |
| B. F. Goodrich | PL-780-1 | 350° F. |

\* Dexter Adhesive & Structural Materials of Pittsburgh, California.
\*\* B. F. Goodrich, Adhesives Systems Division, Arkon, Ohio.

Alternatively, nitrile-phenolic film adhesives can be used such as PL-603 film adhesive from B. F. Goodrich, which has a recommended cure temperature of approximately 350° F., and PL-663 film adhesive also available from B. F. Goodrich, which has a recommended cure temperature of approximately 305° F.

Formed about attachment member 28, and encapsulating at least a portion thereof at that location, is a sealing member or gasket 34 comprising the second portion of gasket assembly 22. Gasket 34 is preferably formed from a thermoplastic or thermoset polymeric material such as polyvinyl chloride (PVC), reaction injection molded (RIM) urethane or other material, preferably molded onto panel surface 14 and/or frit layer 20. The profile of gasket 34 may be variable, depending upon the desired application. For example, FIGS. 1 and 2 illustrate a gasket for use in flush-mounted panel applications wherein the gasket is bonded only to a single side of panel 12. In the alternative, the gasket may be molded about the entire peripheral edge 18 in what is called a three-sided encapsulation, and shown by phantom line 34a. For flush-mounted panel applications, gasket 34 includes a generally rectangular body 36 having a length which extends around at least a portion of panel 12 having a first surface 38 bonded to frit layer 20 and surrounding or encapsulating at least a portion of attachment member 28. Opposite surface 38, gasket 34 includes a channel 40 defined between arcuate flanges 42 where attachment member 28 is exposed. Arcuate flanges 42 are adapted to engage sheet metal pinchweld flange 24 to form a seal and space, panel 12 from flange 24. Gasket 34 and panel 12 may be held tightly against flange 24 by attachment member 28 using a mechanical fastener such as 35, an adhesive bead 44, or both. The adhesive used to adhere panel assembly 10 in opening 26 is typically selected by the vehicle assembler. One commonly used adhesive is known as BETASEAL 57302 adhesive produced by Essex Speciality Products, Inc. of Sayreville, N.J.

Although the above description is specific with respect to the formation of gasket 34 on a single surface of panel 12, it should be understood that gasket 34 may be formed to provide three-sided encapsulation over peripheral edge 18 and have securing flanges overlapping onto surfaces 14 and 16. Details of three-sided encapsulation are described in U.S. patent application Ser. No. 852,416, now U.S. Pat. No. 4,700,525.

Figure 3:
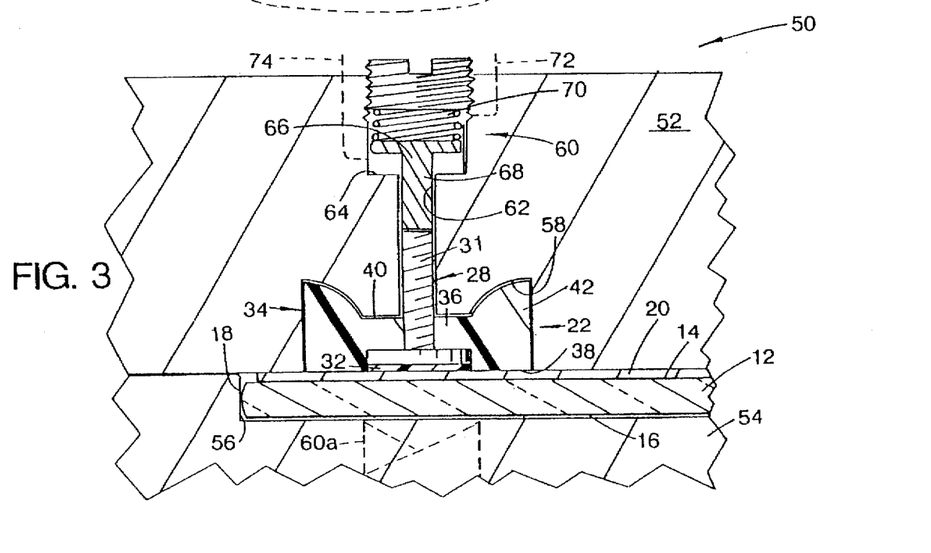
FIG. 3 is a fragmentary section view of a mold generally illustrating one embodiment of the method for making a panel assembly of the type shown in FIG. 2.

FIG. 3 illustrates one embodiment of a method for making panel assembly 10 shown in FIGS. 1–2. Prior to having gasket assembly 22 formed thereon, sheet 12 may be conveyed to a preparation area where at least one surface such as 16 proximate peripheral edge 18 is cleaned with a solvent such as methylethylketone (MEK) to remove oils, dirt and other debris which may interfere with the bonding process. As briefly mentioned above, it is not uncommon for sheet 12 to include a black ceramic or other opaque frit layer 20 deposited on surface 16 proximate peripheral edge 18. If frit layer 20 is present, MEK may be used to clean that surface as well. A coating of primer may be applied to face 16 and/or frit layer 20 to prepare the panel surface to receive assembly 22. The primer is preferably selected to enhance the adhesion between gasket 34 and panel surface 16 and/or frit layer 20, and may be any of several varieties depending on the material of gasket 34 and sheet 12, such as heat and/or pressure activated compositions. The primer may be applied by brush, pad, roller or spray and be allowed to wholly or partially dry to obtain a substantially uniform, even and areally restricted primer coating. A preferred primer for PVC gaskets is an acrylic-based primer sold under the designation A-1100-B combined with an adhesion promoter designated A-1167-B, both of which are available from B. F. Goodrich Co. of Akron, Ohio. Another suitable primer is urethane based and available from the Donnelly Corporation of Holland, Mich., under the designation DX-4A primer.

Following the preparation of sheet 12, it is preferably loaded in an injection molding tool 50 (FIG. 3). Tool 50 includes a first and second tool half 52, 54 which includes a cavity 56 to receive panel 12 and a molding cavity 58 to receive the injected polymeric material forming gasket 34. Tool 50 also includes an ejector mechanism 60 for retaining attachment member 28 securely against frit layer 20 or surface 16 during the molding process. In one embodiment of the method, mold cavity 58 formed in tool half 52 includes a hole 62 adapted to receive shaft 31 of stud attachment member 28 prior to molding. Hole 62 communicates with and extends into a larger passage 64 housing an actuator 66. A pin 68, extending from actuator 66, extends into hole 62 and is adapted to engage the end of stud shaft 31 of stud 28 so that stud 28 is pressed against frit layer 20 when tool 50 is closed. Actuator 66 preferably has a pin length and travel distance so as to retain any attachment member 28 in place when tool 50 is closed. Actuator 66 may be operated by several mechanisms including a spring 70, a fluid such as air or hydraulic fluid introduced into passage 64 on opposite sides of actuator 66 through passages 72, 74, or an electrically operated solenoid. It is desired that ejector mechanism 60 exert sufficient pressure, preferably in excess of 10 psi, against insert 28 so as to prevent polymeric material injected into mold cavity 58 from flowing or "flashing" between head 30 adhered to panel surface 14 and/or frit layer 20.

As an alternative to ejector mechanism 60, attachment member 28 may be retained against frit layer 20 and/or panel surface 14 by a magnetic retaining means 60a such as a magnet or electromagnet located in tool half 54 directly opposite where attachment members 28 are adhered. Magnetic means 60a preferably generates a magnetic field sufficiently strong to pull attachment member 28 against surface 14 and/or frit layer 20 to prevent the invasion of polymeric material between attachment member 28 and frit layer 20 and/or panel surface 14. It is axiomatic that in order for magnetic means 60a to be effective, attachment member 28 must be made from or be coated with a magnetic material.

Once panel 12 has been prepared and located within cavity 56 in tool half 54, adhesive 32 is applied either to attachment members 28 or those portions of the panel to receive the attachment members 28. If an adhesion promoting agent or primer is used, it may be applied, as described above. Following application of the adhesive and any adhesion promoting agents or primer, attachment members 28 are located by ejector or retaining means 60 and 60a when tool 50 is closed. The polymeric material is then injected into mold cavity 58. Mold 50 remains closed for a period of time sufficient to allow the gasket to harden or set up so that it will retain the molded shape once tool 50 is opened and panel assembly 10 is removed. The time measured from the instant the mold is first closed to the instant the same mold is reopened is referred to as the cycle time. It is contemplated by this invention that the objectives described herein be achieved with a cycle time less than about five minutes per panel assembly and, preferably, with a cycle time less than three minutes. Most preferably the cycle time will be between fifteen seconds and two minutes per panel assembly.

The forming of gasket 34, using either of the aforementioned molding processes involves heat either to mobilize the material (PVC) or, as a result of the curing of the material (RIM). A portion of the heat generated during the molding process is conducted to adhesive 32, aiding the curing process and bonding attachment member 28 to the panel. Additional heat sources may be built into molding tool 50 such as cartridge, radiation or electric heaters, hot liquid lines, and the like to aid the curing of adhesive 32. Such heat sources may be designed to heat the entire panel or heat local areas of the panel. If panel 12 is preheated as part of the preparation phase as mentioned above, no additional in-mold heating may be necessary. In addition to, or in place of the heating steps outlined above, heating may occur after assembly 10 is removed from molding tool 50. Possible heat sources include conductive, convective, inductive, microwave, as well as focused and area controlled infrared sources capable of passing energy through panel 12 to heat frit layer 20 and adhesive 32.

Figure 8:
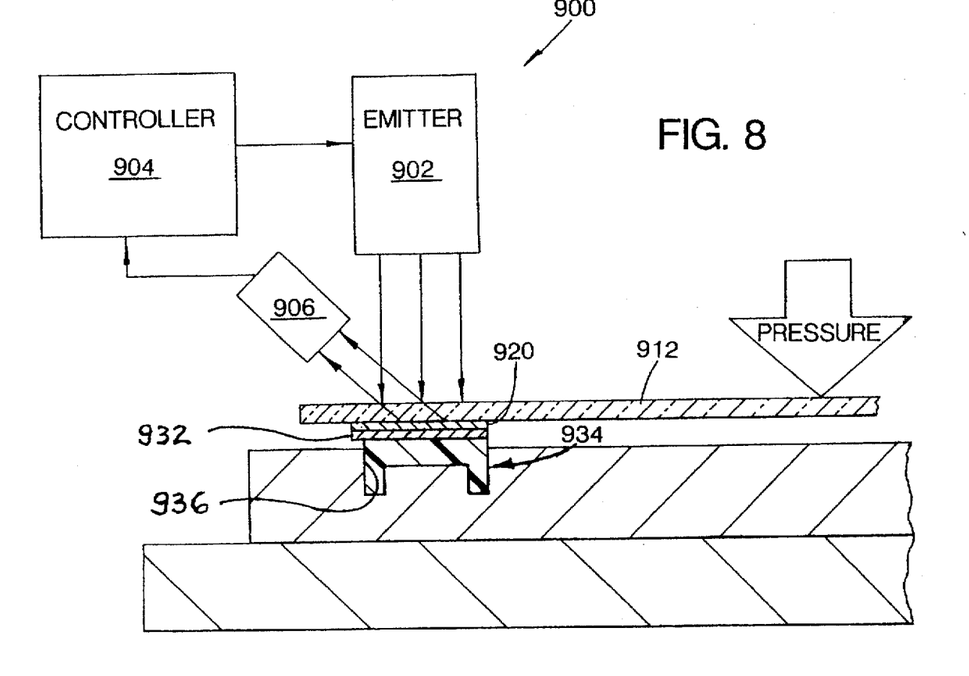
FIGS. 8 and 9 illustrate two examples of energy sources used in the method.
Figure 9:
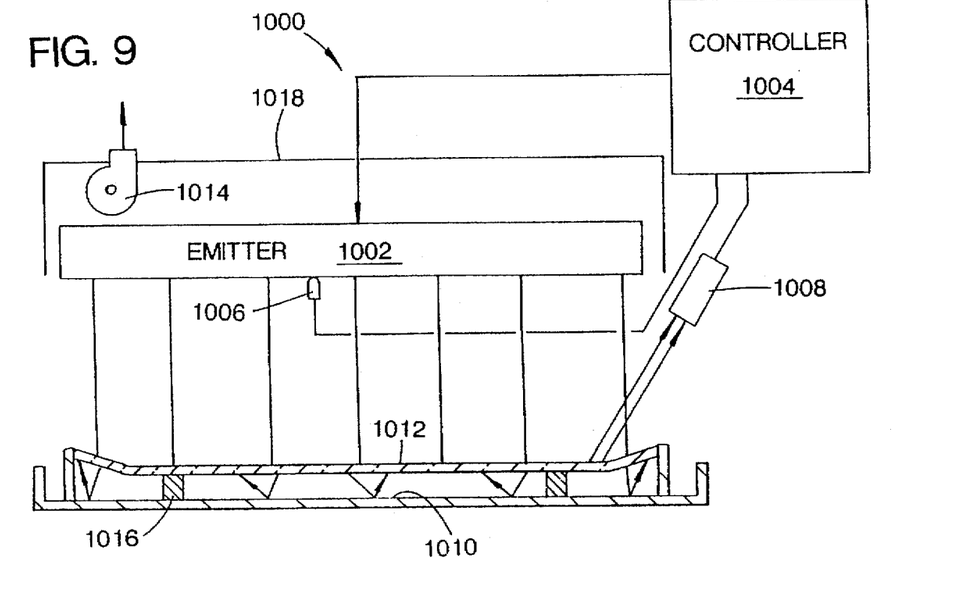

FIGS. 8 and 9 are schematic representations of two energy sources that may be used to heat the frit layer and/or contact boundary between a panel such as 912 and a gasket such as 934 described above. Although each source is described in relation to producing a characteristic energy spectrum, such is by way of example only. Other energy sources may be equally effective in heating the frit layer/contact boundary such as convective, conductive, inductive, and resistive heat sources. Moreover, microwave energy may be used as well.

FIG. 8 generally illustrates a controlled, focused infrared (CFIR) source 900 to heat frit layer 920 and adhesive 932. CFIR 900 includes one or more infrared emitter assemblies 902 such as Model 5305-104 made by Radiant Energy Research, Inc. of Minneapolis, Minn., and disposed above to sheet 912 in a pattern conforming to that region of sheet 912 adapted to receive gasket 934. In the alternative, a single infrared emitter assembly may be moved above sheet 912 by a guided robotic arm in a pattern conforming to that area to receive gasket 934. Computer/process controller 904 preferably causes infrared emitter assembly 902 to emit infrared energy into sheet 912 from a side opposite that containing frit coating 920. A spectrophotometer 906, coupled to computer/process controller 904, detects the energy reflected and radiated from sheet 912. Based upon the feedback from spectrophotometer 906, controller 904 adjusts the power of infrared energy emitted by assembly 902 to obtain maximum absorption by frit layer 920.

FIG. 9, schematically illustrating a controlled area infrared (CAIR) source 1000, may include one or more infrared emitters 1002 such as Model FB122425B3 made by Casso-Solar Corp. of Pomona, N.Y., and may be disposed above and aligned with sheet 1012. Radiation generated by emitter 1002 is controlled by a controller 1004 based upon input from a thermal couple 1006 attached to emitter 1002, and a spectrophotometer 1008 angularly disposed with respect to sheet 1012. A reflector 1010 may be disposed beneath sheet 1012 to reflect heat energy back into the sheet. Sheet 1012 may be supported above reflector 1010 by insulator blocks or spacers 1016 to prevent heat loss by conduction into reflector 1010. A plenum 1018 and an exhaust fan 1014 may be provided to vent fumes driven off during the heating process. Moreover, each sheet 1012 may be properly located with respect to each heating source by using a template or guide 1020 (936 in FIG. 8).

Figure 4:
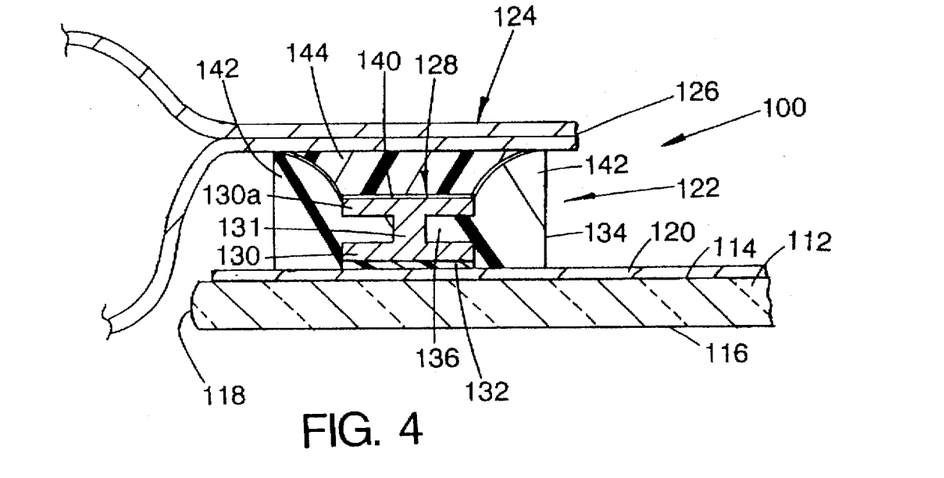
FIG. 4 is a fragmentary section view of an alternate embodiment of the panel assembly taken along a line similar to that for FIG. 2.
Figure 5:
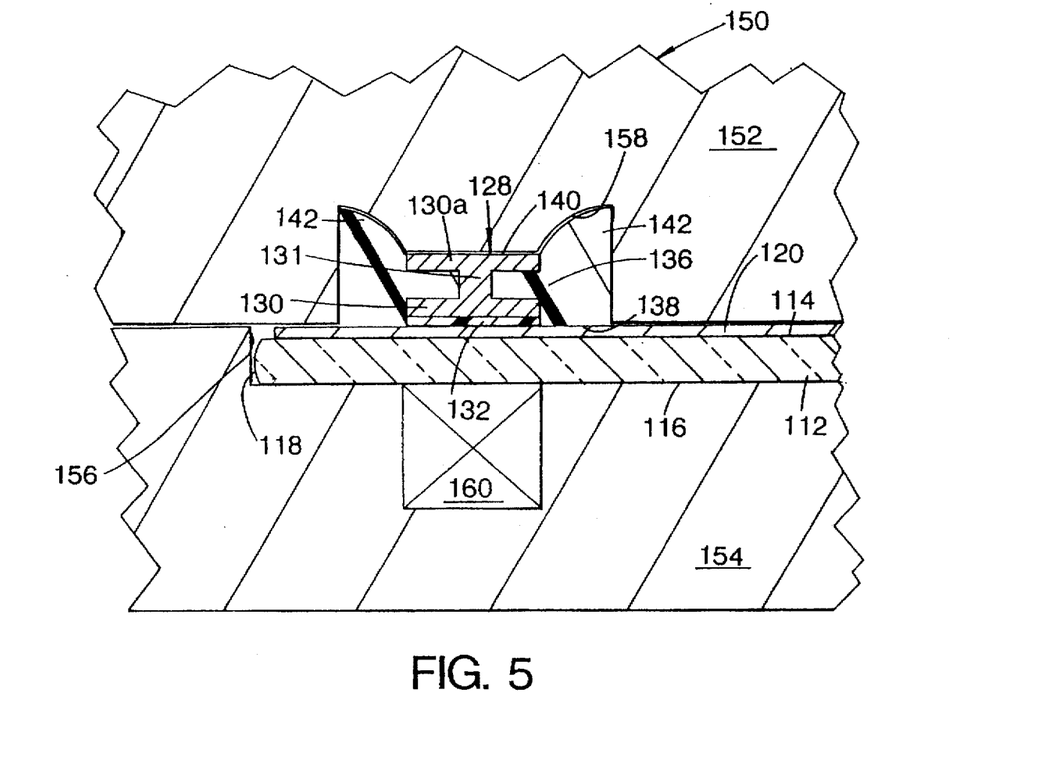
FIG. 5 is a fragmentary section view of a mold generally illustrating an alternate embodiment of the method for making the panel assembly illustrated in FIG. 4.

An alternate embodiment of panel assembly 100 and a method of manufacturing such panel are shown in FIGS. 4 and 5. Panel assembly 100 includes a sheet 112, such as described above, having two substantially parallel sides 114, 116 terminating in a mutual peripheral edge 118. Surface 114 may be coated with a ceramic frit layer 120 restricted to an area proximate peripheral edge 118. Panel 112 is connected to, yet spaced from, pinchweld flange 124 defining panel opening 126 by gasket assembly 122. Assembly 122 includes at least one attachment member 128 having an I-beam cross section wherein lower flange 130 is bonded by adhesive 132, such as that described above, to frit layer 120. A second substantially identical flange 130a is spaced above flange 130 by web 131. A substantial portion of attachment member 128 is encapsulated by polymeric gasket 134, leaving the upper surface of flange 130a exposed between upwardly arcing flanges 142 on opposite sides of member 128. Channel 140 between flanges 142 receives an adhesive 144 selected by the panel installer which bonds attachment member 128 fixed to frit layer 120 and/or panel surface 114 to sheet metal pinchweld flange 124.

The manufacturing of panel assembly 100 may be accomplished by placing panel 112 in a cavity 156 in one-half 154 of a molding tool 150 adapted to receive the panel. Prior to being loaded in molding tool 150, panel 112 may be prepped and primed, as described above. Adhesive 132 is applied either to frit layer 120 or to attachment member 128 before being loaded on panel 112. To properly secure each member 128, magnetic means 160, precisely located in tool half 154, centers each member 128 thereon and retains each tightly against panel surface 114 and/or frit layer 120. For magnetic source 160 to be effective, each attachment member 128 must be at least partially made from or coated with a magnetic material.

With each member 128 properly located, mold half 152 is closed against half 154 and thermoplastic or thermoset polymeric material is injected into mold cavity 158, flowing between and around web 131 and flanges 130, 130a of member 128 and allowed to cure or harden. Although heat associated with the mobilization or curing of the polymeric material forming gasket 134 may be sufficient to activate and set adhesive 132, setting time may be decreased and/or enhanced by additional heat provided by preheating panel 112 prior to molding, or by using heat sources located within tool 150, and/or either general or localized post heating of panel assembly 100 and adhesive 132. Once gasket 134 is set, tool 150 is opened and assembly 100 is removed.

As one example of the method, a nine by nine inch square plaque tool with a gasket cavity one-half inch wide by one-eighth inch thick was modified to retain stud-like attachment members. Holes were drilled in one-half of the mold tool and a spring-biased actuator mechanism was built inside the hole to force the attachment member against a nine by nine inch square glass panel within the mold when closed. A heavy duty die spring obtained from Danly Die Set of Illinois was chosen to force the actuator against the attachment member to prevent PVC thermoplastic from invading between the stud and glass interface. Dichromate coated studs having a length of approximately 0.76 inch, were cleaned with alcohol and preheated to approximately 120° C. (250° F.) for five minutes in a convection oven. A piece of 3M Scotchweld brand AF-163-2U unsupported film with approximately a 0.005-inch thickness was applied to the 0.3 square inch contact area of the stud attachment member. In another set of tests, studs were prepared as described above but were baked for three minutes in a 160° C. (320° F.) convection oven. After heating, stud temperature was recorded to be approximately 80° C. (176° F.) upon removal from the oven. Eight nine-inch square glass panels, 0.125-inch thick, included one surface having a ceramic frit coating. This surface was cleaned using MEK solvent and primed with a urethane based primer designated DX-4A produced by Donnelly Corporation of Holland, Mich. Ten similar glass panels having a ceramic frit coating were cleaned using MEK solvent and primed with an acrylic-based primer designated A-47 produced by Donnelly corporation. All the glass panels were heated in a convection oven for five minutes to an approximate temperature of 120°–140° C. (250°–280° F.).

Figure 7:
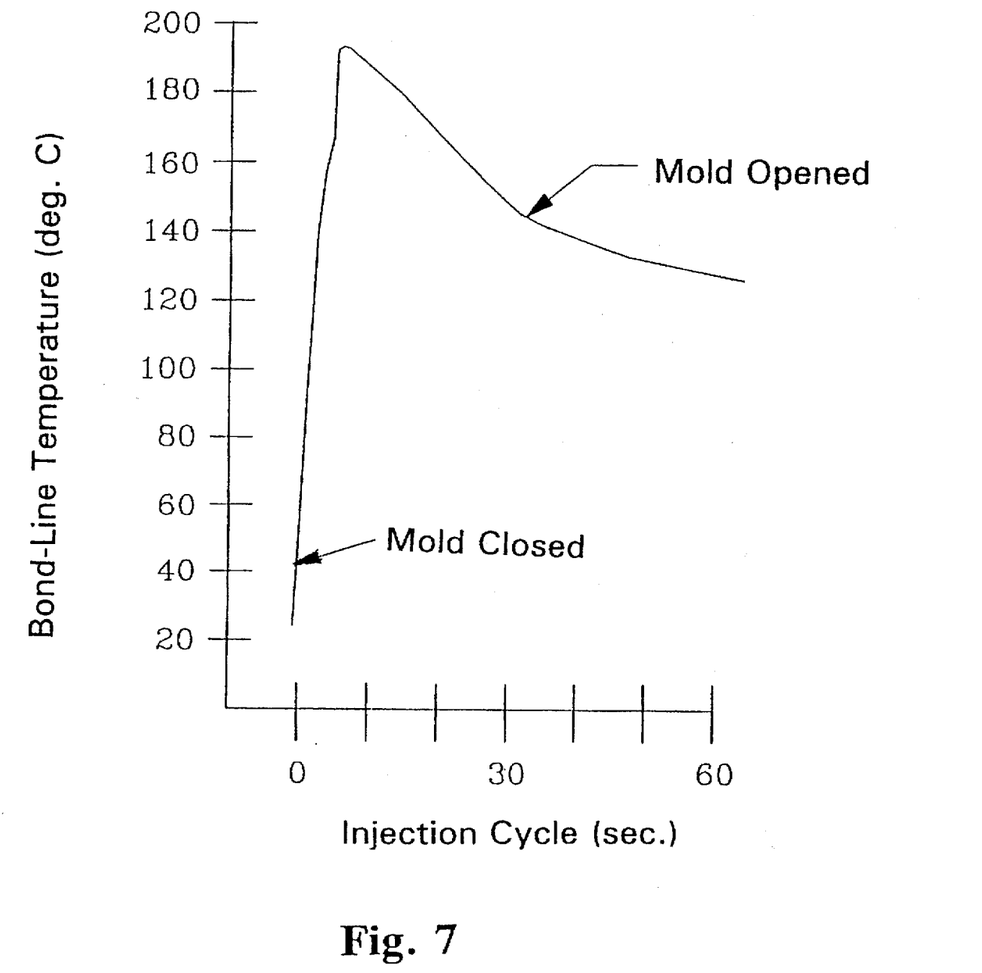
FIG. 7 is a graphical representation between bond-line temperature and injection cycle time.

All eighteen samples were molded on a 50 ton horizontal molding machine produced by Boy Machines, Inc. of Pennsylvania using a clamping pressure of 2,320 psi. Polyvinyl chloride thermoplastic provided by Vista Chemical Company of Texas was injected into the mold cavity at a pressure of 986 psi and a holding pressure of 700 psi. The mold cavity was heated by circulation of hot water and maintained between about 65° C. to 77° C. (150° F. to 170° F.). The actuator mechanism used to hold the insert in place exerted a pressure in excess of 10 psi to prevent the gasket material from "flashing" between the insert and the panel. Two inserts, stud A and stud B, were attached to each panel. Temperature of the molten PVC reached approximately 198° C. (390° F.) which enhanced the cure of the Scotchweld brand adhesive. The temperature of the PVC against the hot glass plaque inside the injection mold during the injection cycle was determined based upon models where a one-inch by five-inch strip of PVC was molded onto a two-inch by five-inch sheet of glass. A thermocouple was placed at the interface between the PVC and glass sheet to sense the temperature with time. The results were recorded on a chart recorder and best illustrated in FIG. 7. After thirty seconds, the mold was opened and the samples were set aside for approximately 24 hours at room temperature before being tested for stud-to-glass bond strength using an Instron tester at 0.1-inch per minute cross-head travel rate. Prior to testing, PVC was removed from around each stud. The average load held by the eight samples primed with Donnelly's DX-4A primer was 130.23 psi (standard deviation 51.65 psi). The average load held by the ten samples primed with Donnelly's A-47 primer was 150.67 psi (standard deviation 42.36 psi). See Tables II and III.

TABLE I

Load Values (lbs) to Failure For 0.3 in² Area
Stud Bonded In-Situ to Glass Primed With DX-4 Primer

| Sample No. | Stud A | Stud B |
|---|---|---|
| 1 | 250.0 (Glass broke) | |
| 2 | 149.3 | 117.8 |
| 3 | 124.4 | 81.5 |
| 4 | 199.6 | 66.7 |
| 5 | 126.6 | 72.1 |
| 6 | 148.3 | 102.9 |
| 7 | 87.1 | 150.9 |
| 8 | 197.4 | 78.9 |

Average Load: 130.23 lbs.
Std Deviation: 51.65 lbs.

TABLE III

Load Values (lbs) to Failure For 0.3 in² Area
Stud Bonded In-Situ to Glass Primed With A-47 Primer

| Sample No. | Stud A | Stud B |
|---|---|---|
| 1 | 153.8 | (Glass broke) |
| 2 | 160.4 | 81.5 |
| 3 | 216.0 | |
| 4 | 62.8 | 165.3 |
| 5 | 148.6 | 101.4 |
| 6 | 137.7 | 92.3 |
| 7 | 207.0 | 182.9 |
| 8 | 208.9 | 156.0 |
| 9 | 185.2 | 144.2 |
| 10 | 166.7 | 141.4 |

Average Load: 150.67 lbs.
Std Deviation: 42.36 lbs.

In another example using RIM urethane, an eight-inch square plaque tool having a spacer cavity one-half inch wide by one-eighth inch thick was modified to retain stud-like inserts. Holes were drilled in one-half of the mold for a spring biased ejector mechanism to force the insert against a eight by eight inch square panel when the mold was closed. The heavy duty die spring described above was used to exert the pressure against the insert. Scotchweld brand AF-163-2U having a non-woven support and 0.005 thickness was applied to the insert. The panel was cleaned with MEK and primed using a material designated AP-134 produced by the Lord Corporation of Erie, Pa.

Samples were molded in the plaque tool using a RIM molding machine produced by Cincinnati Milicron of Cincinnati, Ohio, using a 30 ton clamp-molding press. RIM urethane sold under the trade name SPECTRIM-5 and produced by Dow Chemical of Midland, Mich., was injected into the mold cavity of the plaque tool at a line pressure of approximately 2000 psi. The mold cavity was heated and maintained at a temperature between 65° C. and 77° C. (150° F. and 170° F.). The temperature of the gasket produced as a result of the exothermic reaction between the polyisocyanate and polyol was between 93° C. and 177° C. (200° F. and 350° F.), and sufficient to enhance the cure of the adhesive bonding the insert to the panel. Other samples were run using the RIM process where additional heat was provided by cartridge heaters in the molding tool. Cartridge heaters were placed in the mold from a side of the panel opposite the insert to provide localized heating of the adhesive and the insert, and to enhance cure of the adhesive.

For example, two trials were conducted using an eight-inch square plaque tool modified to accomplish single-sided encapsulation along with insert (stud) locators for in-situ bonding to glass. Cartridge heaters were built into the tool to provide additional heat to achieve localized glass surface temperatures in the 90° C. to 180° C. (200° F. to 350° F.) range. The heaters were located so as to heat the glass and frit layer opposite the insert and cure the adhesive during the molding cycle. Cycle time for each mold was approximately 40 seconds.

In the first trial, samples were molded with and without the use of the cartridge heaters in the molding tool. Scotchweld brand AF-163-2U adhesive film was press-applied to studs identical to the ones used in the PVC trials described above. The studs were in-situ bonded to eight-inch square glass plaques which had been primed with AP-134 primer produced by Lord Corporation of Erie, Pa. When the cartridge heaters were used, localized glass surface temperatures may have reached between 90° C. and 180° C. (200° F. and 350° F.). Samples tested for stud adhesion displayed mixed results, with adhesion generally increasing with increased glass surface temperatures.

In the second trial, the inserts were preheated to a temperature of approximately 125° C. (255° F.) and then fixed with the AF-163-2U adhesive tape. The inserts and adhesives were baked for three minutes in a 160° C. (320° F.) convection oven. After heating, insert temperatures were recorded on average to be approximately 80° C. (175° F.) upon removal from the oven. These inserts (studs) were then in-situ bonded to a primed eight-inch square glass plaque without the use of centridge heaters. Molding tool temperature was maintained between 82° C. and 93° C. (180° F. and 200° F.). The cycle time from the RIM urethane injection to opening of the tool was approximately 40 seconds. Load tests were then performed on the samples using an Instron tester to evaluate the bond strength. Prior to testing, urethane was removed from around each insert. The results of the tests conducted on the three samples are reflected in Table IV.

TABLE IV

Load Values (lbs) To Failure for 0.3 in² Area Stud Bonded In-Situ To Glass Primed With AP-134 Primer

| | (lbs) | |
|---|---|---|
| Sample No. | Stud A | Stud B |
| 1 | 158.3 | 87.2 |
| 2 | 123.5 | 88.4 |
| 3 | 79.5 | 79.7 |

Average Load: 102.8 lbs.
Standard Deviation: 28.97 lbs.

Figure 6A:
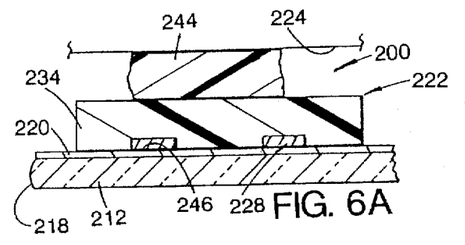
FIGS. 6A–6G are fragmentary section views of the panel assembly illustrating alternate embodiments of the insert.

FIGS. 6A–6F illustrate in cross section, taken along line VI—VI of FIG. 1, different embodiments of a strip insert such as briefly mentioned above. FIG. 6A illustrates a panel assembly 200 which includes a sheet-like panel 212 having a gasket assembly 222 secured thereto. Gasket assembly 222 includes a strip-like insert or attachment member 228 adjacent to and bonded against sheet 212 by one of the adhesives described above. At predetermined intervals along the length of strip insert 228, one or more windows 246 may be formed therein, extending completely through insert 228 and exposing panel 212 therethrough. Insert 228 is, in turn, encapsulated by a polymeric sealing gasket 234, molded to sheet 212 near the peripheral edge 218. To manufacture assembly 200, sheet 212 is placed in a mold, and insert 228 is held firmly against sheet 12, either by the magnetic means described earlier, or by a pin extending from the mold half adjacent the insert, while gasket 234 is molded over it. The windowed strip provides a mechanical coupling between the gasket and the panel, strengthening the bond therebetween. Gasket 234 and/or panel 212 may then be fixed with respect to pinchweld flange 224 by adhesive bead 244.

Figure 6B:
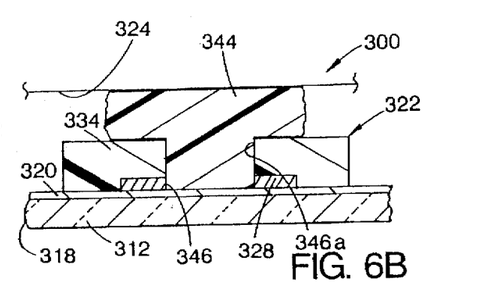

An alternate embodiment 300 of FIG. 6A is shown in FIG. 6B wherein window 346 of insert 328 is extended up through gasket 334 as window 346a exposing insert 328 to adhesive bead 344. Adhesive bead 344 used to bond assembly 300 to pinchweld flange 324 fills windows 346, 346a and is able to bond sheet 312 directly to pinchweld flange 324.

Figure 6C:
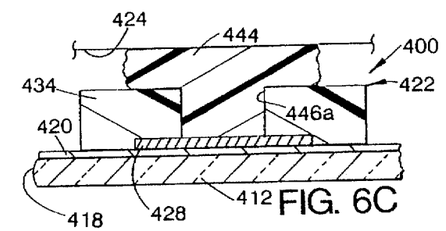

FIG. 6C illustrates a panel assembly 400 wherein strip insert 428 is substantially solid and adhered to panel 412 by one of the adhesives described above. Gasket 434 is molded over and encapsulates insert 428, except portions exposed through window(s) 446a. Each window 446a allows adhesive bead 444 to bond insert 428 to the pinchweld flange 424. Insert 428 also serves to bond with gasket 434 and mechanically anchor it in place.

Figure 6D:
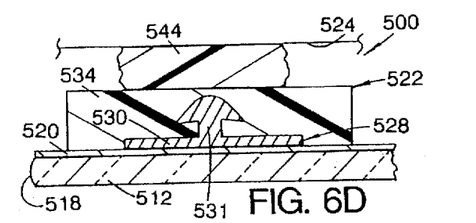

Assembly 500, shown in FIG. 6D, illustrates yet another variation of insert 528 providing a mechanical anchor for gasket 534. Insert 528 may be of the strip-type described earlier or may be individual or of local extent including a base 530 adhered to frit layer 520 and/or panel 512. At predetermined intervals, posts or trees 531 extend from base 530. Strip insert 528, base 530 and tree(s) 531 are encapsulated by gasket 534 molded on panel 512. An adhesive 544 is then used to fix panel assembly 500 against pinchweld flange 524. The firm bond of insert 528 to panel 512, together with the mechanical anchoring of gasket 534 by tree 531, provides a reliable bond for adhesive bead 544 to hold the panel assembly.

Figure 6E:
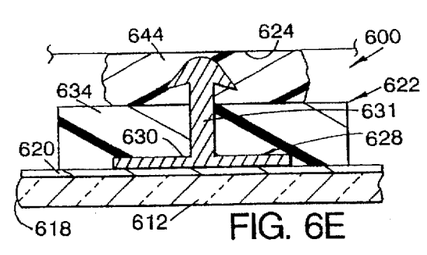

FIG. 6E is yet another embodiment 600 of the inventive panel assembly wherein strip insert 628 includes a base portion 630 adhered to one surface of panel 612 proximate peripheral edge 618. Frit layer 620 is deposited on the surface of panel 612 receiving the insert. Periodically along strip insert 628, posts or trees 631 extend from base 630. A substantial portion of insert 628, including base 630 and a portion of post 631, are embedded within a molded gasket 634. The upper portion of tree 631 extends beyond gasket 634 and is intended to be surrounded by, and retained within, adhesive bead 644 retaining panel 600 against pinchweld flange 624.

Figure 6F:
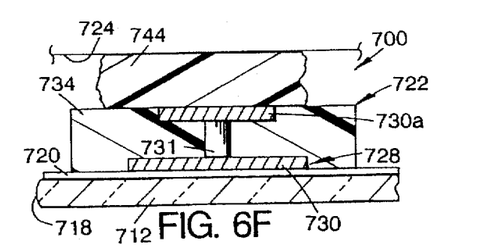

FIG. 6F illustrates an alternate embodiment of the I-beam insert described earlier in relation to FIGS. 3 and 4. Insert 728 includes a base 730 which may or may not extend as a strip along the length of gasket 734. At intervals, a post 731 supports an upper plate 730a having an upper surface flush with the upper surface of gasket 734. Base 730 is adhered to frit layer 720 and/or panel 712 when gasket material 734 is molded onto panel 712 and encapsulates most of insert 728. Adhesive bead 744, fixing panel assembly 700 to pinchweld flange 724, is able to then bond panel 712 through insert 728. The T-shape or upper plate 730a of insert 728 also serves as a mechanical anchoring device to retain gasket 734 against panel 712.

Figure 6G:
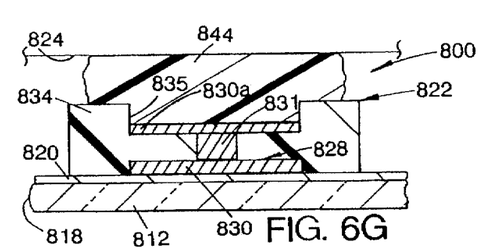

FIG. 6G illustrates yet another embodiment of the invention which is a variation of the one shown in FIG. 6F. Insert 828 includes an upper plate 830a exposed below the upper surface of gasket 834 by well 835. During molding of gasket material 834, a spring-biased and retractable locator pin, or similar means, is used to force insert 828 against frit layer 820 and to prevent gasket material from invading between the upper surface of plate 830a and the pin during the molding operation. According to this configuration, adhesive bead 844 can bond to pinchweld flange 824 (which is typically metal or a plastic composite) by, for example, metal-to-metal bonds by contact with the upper surface of plate 830a, and by metal-to-polymer bonds by contact with the polymeric walls of well 835 formed above insert 828.

Several advantages are provided by the various embodiments illustrated above, and by the combination. For example, an adhesive optimized for bonding metal to metal can be used in, for instance, the constructions of FIG. 6C and FIGS. 6E–6G to achieve a secure bond between the pinchweld flange and the panel. For gasket materials that achieve a more secure bond to the material of the insert than that achieved to the surface of the substrate, constructions such as in FIGS. 6A–6B can be used. Also, the constructions of FIGS. 6A–6D and FIGS. 6F–6G can be used where it is undesirable to have a member protruding from the molded gasket, as seen in FIGS. 2 and 6E.

Additional advantages provided by the panel assembly and method for manufacturing include using existing molding machines with relatively inexpensive modifications when compared to the expense of additional equipment and process time for attaching studs or clips inboard or outboard of the gasket. Moreover, the bond of the attachment member with the panel is improved over assemblies wherein the attachment member is suspended within the gasket material. The bond of the gasket to the panel, together with the bond of the attachment member to the panel, and cured or hardened using heat, enables secure retention of the panel superior to that achieved merely from studs floating or suspended in gaskets.

Although the invention has been described with respect to specific preferred embodiments thereof, many variations and modifications will become apparent to those skilled in the art. It is, therefore, the intention that the appended claims be interpreted as broadly as possible in view of the prior art to include all such variations and modifications.

The embodiments of the invention in which an exclusive property or privilege is claimed are defined as follows:

1. A method for forming a panel assembly for use in vehicles, buildings and other structures including bonding a pre-formed insert to a substrate comprising:
   providing a substrate in the form of a sheet;
   applying an adhesive to at least one of said insert and a portion of a surface of said substrate;
   holding said insert against said portion of said surface of said substrate; and
   molding a polymeric material over at least a portion of said insert and onto at least said surface of the substrate to form said panel assembly, said molding using heat; said bonding including conducting heat from said molding to said adhesive during said molding for aiding in the bonding of said insert to said substrate;
   said holding said insert including forcing said insert against said portion of said surface of said substrate using sufficient pressure to prevent polymeric material from flowing between said insert and said substrate.

2. The method of claim 1, further including adding an adhesion promoting material to at least one of said surface of the substrate, said insert, and said adhesive.

3. The method of claim 1, wherein said adhesive is heat activatable, said method further including curing or setting said heat activatable adhesive with said heat from said molding to bond said insert to said surface of said substrate.

4. The method of claim 1, wherein said bonding also includes heating said substrate during said molding.

5. The method of claim 1, wherein said bonding also includes heating said adhesive after said molding of said polymeric material.

6. The method of claim 1, wherein said bonding includes conducting said heat to said adhesive by said polymeric material.

7. The method of claim 6, wherein conducting said heat includes injecting a hot thermoplastic polymeric material about at least a portion of said insert on said substrate.

8. The method of claim 6, wherein conducting said heat includes injecting a thermoset polymeric material about at least a portion of said insert on said substrate.

9. The method of claim 1, wherein said bonding includes heating said substrate prior to said molding, said substrate retaining heat which is conducted to said adhesive.

10. The method of claim 1, wherein forcing said insert against said substrate includes biasing said insert against said substrate.

11. The method of claim 1, wherein forcing said insert against said substrate includes using an actuator to force said insert against said substrate.

12. The method of claim 1, wherein said bonding includes applying heat, in addition to the heat of said molding, generally to said insert, said polymeric material and said substrate during said molding.

13. The method of claim 1, wherein said bonding includes applying heat, in addition to the heat of said molding, locally to those areas immediately surrounding said adhesive during said molding.

14. The method of claim 1, further including the step of applying a primer to at least said portion of said surface of the substrate.

15. The method of claim 1, wherein the step of molding includes:
   closing a molding tool about said substrate;
   molding the polymeric material on said at least said surface of said substrate; and
   opening said molding tool whereby a cycle time between the instant said molding tool is closed and opened is minimized.

16. The method of claim 15, wherein the cycle time is less than five minutes.

17. The method of claim 15, wherein the cycle time is greater than fifteen seconds and less than three minutes.

18. A method for forming a panel assembly for use in vehicles, buildings and other structures, comprising:
   providing a substrate in the form of a sheet;
   applying an adhesive to at least one of a portion of an attachment member and a portion of a surface of said substrate;
   retaining said attachment member in contact with said portion of said surface of said substrate; and
   forming a gasket assembly on said substrate by molding a polymeric material on at least said surface of said substrate and encapsulating at least said portion of said attachment member retained on said surface substantially simultaneously with retaining said attachment member in contact with said substrate surface to form said panel assembly,
   said molding using heat, with said heat from said molding aiding in the bonding of said attachment member to said substrate;
   said retaining said attachment member on said substrate further including forcing said attachment member against said substrate using a sufficient pressure to prevent said polymeric material from flowing between said attachment member and said substrate.

19. The method of claim 18, further including heating said adhesive for setting said adhesive and bonding said attachment member to said substrate.

20. The method of claim 18, further including heating said adhesive with additional heat applied locally to said polymeric material and said substrate and near said attachment member.

21. The method of claim 18, wherein said molding includes closing a molding machine about said substrate; and further including minimizing a cycle time between an instant said molding machine is closed about said substrate to an instant said molding machine is opened.

22. The method of claim 21, wherein the cycle is less than five minutes.

23. The method of claim 21, wherein the cycle time is between fifteen seconds and three minutes.

24. A method for making a panel assembly for vehicles comprising:

providing a panel having at least one surface;

applying an adhesive to at least one of a portion of an attachment member and a portion of said surface of said panel;

retaining said attachment member in intimate contact with said portion of said surface; and substantially simultaneously with said step of retaining, molding a polymeric material on said surface of said panel with a molding apparatus and encapsulating said portion of said attachment member therein to form said panel assembly;

said molding using heat within said mold apparatus, with said heat from said molding aiding in the bonding of said attachment member to said substrate;

said retaining said attachment member in contact with said panel including mechanically forcing said attachment member against said surface of said panel using a sufficient pressure to prevent said polymeric material from flowing between said attachment member and said panel.

25. The method of claim 24, further comprising hardening said adhesive between said surface and said attachment member with said heat from said molding to form a secure bond therebetween.

26. The method of claim 25, also including heating said adhesive after said molding.

27. The method of claim 26, wherein said heating includes applying additional heat locally about the area in which said attachment member is to be retained.

28. The method of claim 26, wherein said heating said adhesive includes general heating of said panel to conduct heat to said adhesive.

29. The method of claim 25, wherein hardening said adhesive also includes generating heat with a source disposed within said molding apparatus.

30. The method of claim 24, including preheating said panel prior to said molding.

31. The method of claim 24, further including heating said adhesive with additional heat applied locally to said panel area near said attachment member.

* * * * *

UNITED STATES PATENT AND TRADEMARK OFFICE
CERTIFICATE OF CORRECTION

PATENT NO.     : 5,707,473
DATED          : January 13, 1998
INVENTOR(S)    : Raj K. Agrawal et al.

It is certified that error appears in the above-identified patent and that said Letters Patent is hereby corrected as shown below:

Column 9,
Lines 26-27, "corporation" should be -- Corporation --.

Column 10,
Line 2, "Table I" should be -- Table II --.

Signed and Sealed this

Fourth Day of February, 2003

JAMES E. ROGAN
*Director of the United States Patent and Trademark Office*